A. C. EVANS.
FILTER VALVE.
APPLICATION FILED MAY 20, 1920.

1,407,397. Patented Feb. 21, 1922.

Inventor
A. C. Evans,
E. W. Anderson Jr.
By
Attorney

UNITED STATES PATENT OFFICE.

ALFRED C. EVANS, OF HAWTHORNE, NEW JERSEY.

FILTER VALVE.

1,407,397.   Specification of Letters Patent.   Patented Feb. 21, 1922.

Application filed May 20, 1920. Serial No. 382,951.

*To all whom it may concern:*

Be it known that I, ALFRED C. EVANS, a citizen of the United States, resident of Hawthorne, in the county of Passaic and State of New Jersey, have made a certain new and useful Invention in Filter Valves; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to filter valves or sand valves, used in filtering tanks and reservoirs, and connected to the outlet or delivery pipe for the filtered liquid. The number of valves used in each filtering plant depends upon the size and capacity of the plant, the valves serving to strain the liquid or prevent the finer particles of the filtering material, usually stone, gravel, or sand, from passing into the delivery pipe with the filtered liquid.

Filter valves are subject to becoming clogged by accumulation of these finer particles in the mouth or inlet opening of the valve, and by corrosion, and it is an object of this invention to prevent this clogging or accumulation and to adapt the valve to be automatically cleaned or maintained in clean condition by the reversal of the flow of the water or liquid being filtered, such reversal occurring in practice more or less frequently in order that the filter bed shall be maintained in a clean and operative condition.

With the above as the principal objects in view, the invention comprises the combination and arrangement of parts hereinafter described in detail, pointed out in the appended claims and illustrated in the accompanying drawings in which:—

Figure 1:
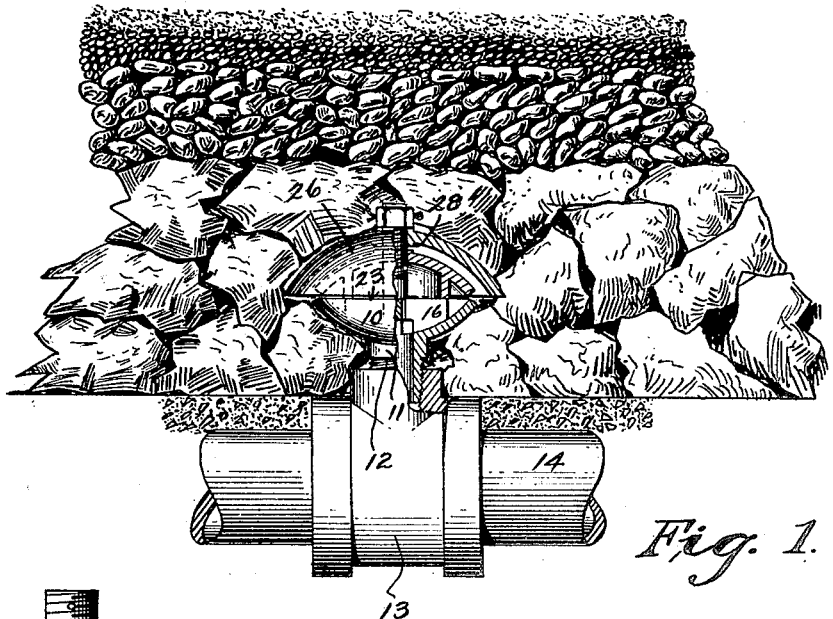
Figure 2:
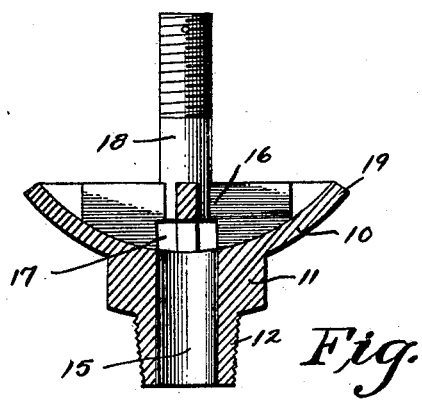
Figure 4:
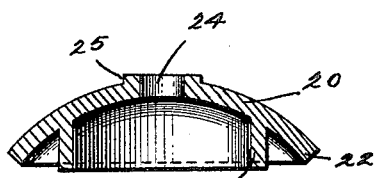
Figure 3:
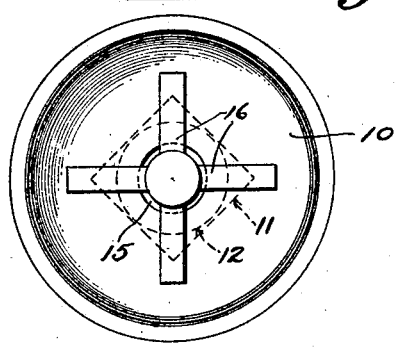
Figure 5:
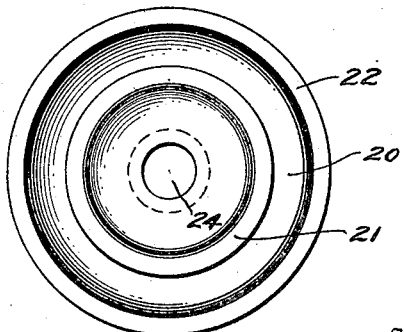

Figure 1 is an elevation partly in section of the improved filter valve in position in the bottom of a filter and connected to a delivery pipe, Figure 2 is a vertical sectional view of the base or body member of the valve, Figure 3 is a top plan view of the same, Figure 4 is a cross sectional view of the movable member of the valve, and Figure 5 is a bottom plan view of said member.

In the drawing, 10 indicates the base or body member of the valve having the form of a segment of a hollow sphere, on the under side of which is a polygonal boss 11 and projecting downwardly from said boss is a threaded connection 12 that is screwed into a coupling 13 on the outlet or delivery pipe 14. A bore 15 is formed through the boss 11 and connection 12 and opens into the bottom of the valve body 10. Within the valve body 10 is a spider 16 having four arms, more or less, that are integral with or connected to the inner wall of the body at the bottom and terminate at their outer ends within the edge of the body to permit a free flow of water over said edge. The spider arms 16 are cut away at the bottom for about one half their height in line with bore 15 to provide a passage 17 for the uninterrupted flow of filtered water from the body into the bore 15. A stem 18 projects upwardly from the center of the spider 16 and is threaded at its upper end as shown. The edge 19 of the body 10 is inclined downwardly towards the outer wall of the body for a purpose to be described later.

Above the fixed body member 10 is a valve member 20 of similar size and shape as the body 10, having an integral spacing ring 21 depending from its inner wall and adapted to rest on the spider 16. This ring normally spaces the inclined edge 22 of the valve from the like inclined edge 19 of the body to form an annular or continuous peripheral opening 23 in the valve for the entrance of filtered water. An opening 24 is formed through the top of the valve member and an exterior boss 25 for the stem 18 to pass easily therethrough and permit free vertical movement of the valve member whenever necessary to widen the inlet opening 23.

Over the valve member 20 is a cap or guard bell 26, of similar shape to the valve member and threaded on the stem 18 for vertical adjustment, being locked in position after adjustment by a nut 27. A boss 28 may be formed on the interior of the cap or guard bell to provide an abutment for the valve 20 and limit the upward movement of the valve. The cap or guard bell extends over the entire valve, the open bottom terminating in the plane of the valve inlet opening 23 so that water passing through the filter bed may readily reach the inlet opening.

In use, the filter valve is placed in the bottom of a filter tank with the stem 18 vertical and connection 12 screwed to the coupling 13. The filter bed is then laid on the bottom of the tank and over the valve, and the water turned on. The water, seeping through the filter bed, on reaching the valve, enters the annular bevel-form inlet opening or valve mouth 23 to the interior of the valve, and thence passes to the delivery pipe. The upper valve member 20, movable freely on the stem 18, is supported by the spider 16, its weight being sufficient to keep it in lower or dropped position, with the inlet opening or mouth 23, at its minimum width. In this position, the inclined edges 19, 22 of the said opening are presented outwardly and permit the water to enter freely, and smaller or finer particles of the filtering material will accumulate to a certain extent in said mouth but will be prevented from lodging or wedging therein owing to its bevel form, and will be prevented from passing to the interior of the valve owing to the straining action thereof. And when the flow of the water is reversed as stated, owing to the bevel form of the mouth or inlet opening 23, the said accumulation will be more readily washed away therefrom. In this reversal of the water, the upper valve member is lifted, thereby enlarging the inlet opening of the valve and further facilitating the automatic cleansing thereof.

The valve is of simple nature, composed of few parts readily installed, and when necessary can be readily removed and taken apart.

I claim:—

1. A filter valve, comprising a dished base, and an upper member, said base and said member having oppositely beveled edges spaced apart to form a peripheral inlet opening contracting inwardly for straining purposes and expanding outwardly for cleaning purposes.

2. A filter valve, comprising a dished base, and an upper member, said base and said member having oppositely beveled edges spaced apart to form a peripheral inlet opening, and said upper member being vertically movable to enlarge said opening upon reversal of the flow of the liquid being filtered, and a guard overlying said upper member and adapted to take the weight of the overlying material from said upper member and to provide for its free vertical movement.

3. A filter valve, comprising a base having a downwardly and outwardly inclined peripheral edge, a vertically movable upper member conforming to said base and having an upwardly and outwardly inclined peripheral edge spaced from said edge of the base to form an inlet opening for the filtered liquid, and a guard cap overlying said upper member and adapted to provide for the free movement and to limit the rise thereof.

4. A filter valve, comprising a base having a downwardly and outwardly inclined peripheral edge, an inner spider, and a vertical stem, an upper member conforming to said base and vertically movable upon said stem and having an upwardly and outwardly inclined peripheral edge spaced from said edge of the base to form an inlet opening, and a guard cap engaging said stem and overlying and adapted to provide for the free movement of and to limit the rise of said upper member.

5. A filter valve, comprising a dished base, and an upper member having opposed peripheral edges providing an inlet opening for the filtered liquid, said upper member being vertically movable to enlarge said opening upon reversal of the flow of the liquid, in combination with a guard device overlying said upper member and adapted to take the weight of the overlying material therefrom and to provide for its free movement.

In testimony whereof I affix my signature in presence of two witnesses.

A. C. EVANS.

Witnesses:
GEORGE G. POTTERTON,
EMIL L. FICHTNER.